March 31, 1953  T. H. KINMAN  2,633,489
CRYSTAL VALVE OR RECTIFIER
Filed March 25, 1952
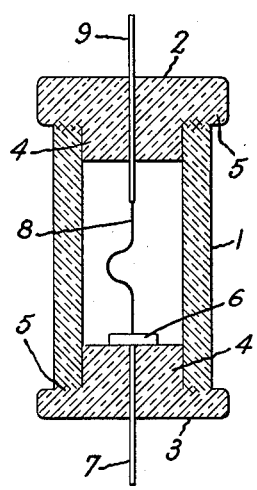
Inventor:
Thomas H. Kinman,
by Merton D. Morse
His Attorney.

Patented Mar. 31, 1953

2,633,489

UNITED STATES PATENT OFFICE 2,633,489

CRYSTAL VALVE OR RECTIFIER

Thomas H. Kinman, Rugby, England, assignor to General Electric Company, a corporation of New York Application March 25, 1952, Serial No. 278,367
In Great Britain April 3, 1951

3 Claims. (Cl. 175—366)

This invention relates to alternating current rectifiers of a type now well-known, in which two elements are enclosed in a casing and mounted at opposite ends of the casing, one of these elements consisting of a semi-conductor usually referred to as the "crystal" and consisting of a material such as germanium. The other element, which extends from the other end of the enclosure into contact with the crystal is in the form of a metal wire and is usually referred to as the "cat-whisker."

The present invention has for important objects, the provision of an improved structure for such rectifiers which will withstand higher operating temperatures; is hermetically sealed to prevent detrimental effects by atmospheric conditions; may be smaller and more easily and cheaply manufactured than constructions presently employed for such rectifiers.

Further objects and advantages will become apparent as the following description proceeds, reference being had to the accompanying drawing and its scope will be pointed out in the appended claims. In the drawing, the single figure is an elevational view in section of a point contact rectifying device embodying my invention.

The invention relates particularly to the enclosing glass casing and the manner in which the whisker and crystal assemblies are supported from the ends thereof by a pair of pre-formed washers of glass having a lower melting point than the casing.

Referring now to the drawing, the illustrated embodiment of my invention includes a short length of glass tubing as the casing 1; two pre-formed washers 2 and 3 of low melting point or "solder glass" which have projecting portions 4 extending into and conforming in size and shape with the interior of the tubing and flange portions 5 which rest on the ends of the tubing 1.

The crystal or wafer 6 of germanium is soldered to a suitable lead-in wire 7 to provide a crystal assembly. In a similar manner, a whisker 8 is soldered to a lead-in conductor 9 to provide a whisker assembly. The lead-in conductors 7 and 9 are threaded through central apertures formed in the washers 2 and 3 with the point of the whisker in contact with the crystal. In completing the assembly, these parts may be held in a suitable jig or fixture so that the whisker and crystal are held in a definite positional relationship and the whisker welded to the crystal face if desired. The washers 2 and 3 are then heated in a suitable manner as by a gas burner which directs the flame in a relatively narrow region near the junction of the flanges 5 and the ends of the casing to join the casing and the washer together. At the same time, the washers are heated sufficiently to seal the lead-in conductors and washers together.

It is apparent that the whisker and crystal assembly may be sealed to their respective washers prior to sealing to the casing if desired and in that event, the crystal may actually be fused to the face of the projection portion 4 of the washer 3.

The casing 1 may be of any suitable glass such as commonly used for vacuum tight envelopes, (i. e. either hard or soft) and the glass for the washers 2 and 3 is then selected to have a temperature coefficient of expansion substantially matching that of the glass tubing. A large number of low melting point or solder glasses are available which match sufficiently well the expansion characteristics of the glasses in common use. By utilizing a material for the washers having a low melting point with respect to the casing, it is possible to complete the assembly without deforming the casing and destroying the positional relationship of the whisker and crystal.

While I have described and illustrated the particular embodiment of my invention, it will be apparent to those skilled in the art that changes and modifications may be made without departing from my invention in its broader aspects and I aim therefore in my appended claims to cover any such modifications as fall within the true spirit and scope of my invention.

What I claim as new and desire to secure by Letters Patent of the United States is:

1. A point contact rectifying device comprising a whisker assembly including a lead-in conductor and whisker, a crystal assembly including a lead-in conductor and crystal, a tubular glass casing, means supporting said whisker and crystal within said casing with said whisker in contact with said crystal cromprising a pair of glass washers each apertured to receive one of said lead-in conductors and each having a flange portion resting on one end of said casing and a projecting portion extending into said casing and conforming in size and shape with the interior wall of said casing, said washers being fused respectively to said lead-in conductors and the opposite ends of said casing.

2. A point contact rectifying device comprising a whisker assembly including a lead-in conductor and whisker, a crystal assembly including a lead-in conductor and crystal, a tubular glass casing, means supporting said whisker and crystal within said casing with said whisker in contact with said crystal, comprising a pair of glass washers of lower melting point glass than said casing, each of said washers having a central aperture to receive one of said lead-in conductors and each having a flange portion resting on one end of said casing and a projecting portion extending into one end of said casing and conforming in size and shape with the interior wall of said casing, said washers being fused respectively to said lead-in conductors and the opposite ends of said casing.

3. A point contact rectifying device comprising a whisker assembly including a lead-in conductor and whisker, a crystal assembly including a lead-in conductor and crystal assembly, a tubular glass casing, means supporting said whisker and crystal within said casing with said whisker in contact with said crystal comprising a pair of glass washers each apertured to receive one of said lead-in conductors and each having a flange portion resting on one end of said casing and a projecting portion extending into one end of said casing and conforming in size and shape with the interior wall of said casing, said washers being fused respectively to said lead-in conductors and the opposite ends of said casing and said crystal being fused to the face of one of said projecting portions.

THOMAS H. KINMAN.

REFERENCES CITED

The following references are of record in the file of this patent:

UNITED STATES PATENTS

| Number | Name | Date |
|---|---|---|
| D. 156,501 | Gates | Dec. 20, 1949 |
| 756,676 | Midgley | Apr. 5, 1904 |
| 1,633,059 | Adam | June 21, 1927 |
| 1,792,781 | Thilo | Feb. 17, 1931 |